(12) United States Patent
D'Ercoli et al.

(10) Patent No.: US 10,083,334 B2
(45) Date of Patent: Sep. 25, 2018

(54) BARCODE RECONSTRUCTION UTILIZING A SEQUENCE ALIGNMENT MATRIX

(71) Applicant: DATALOGIC IP TECH S.R.L., Monte San Pietro, Bologna (IT)

(72) Inventors: Francesco D'Ercoli, Bologna (IT); Marco Cumoli, Monte San Pietro (IT)

(73) Assignee: DATALOGIC IP TECH S.R.L., Bologna (IT)

( * ) Notice: Subject to any disclaimer, the term of this patent is extended or adjusted under 35 U.S.C. 154(b) by 0 days.

(21) Appl. No.: 15/370,706

(22) Filed: Dec. 6, 2016

(65) Prior Publication Data

US 2018/0157887 A1 Jun. 7, 2018

(51) Int. Cl.
*G06K 7/10* (2006.01)
*G06K 7/14* (2006.01)
*G06K 19/06* (2006.01)

(52) U.S. Cl.
CPC ......... *G06K 7/1491* (2013.01); *G06K 7/1413* (2013.01); *G06K 19/06028* (2013.01)

(58) Field of Classification Search
CPC .............. G06K 7/1491; G06K 7/1413; G06K 19/06028
USPC ....................................... 235/462.12, 462.01
See application file for complete search history.

(56) References Cited

U.S. PATENT DOCUMENTS

| | | | | |
|---|---|---|---|---|
| 5,296,691 A * | 3/1994 | Waldron | ............ | G06K 7/10861 235/462.12 |
| 5,384,451 A * | 1/1995 | Smith | ................ | G06K 7/10851 235/436 |
| 5,387,787 A * | 2/1995 | Waldron | ............ | G06K 7/10861 235/462.12 |
| 5,444,231 A | 8/1995 | Shellhammer et al. | | |
| 5,457,308 A * | 10/1995 | Spitz | ........................ | G06K 7/14 235/462.12 |
| 5,495,097 A | 2/1996 | Katz et al. | | |
| 5,821,519 A * | 10/1998 | Lee | .......................... | G06K 7/14 235/462.16 |
| 5,936,224 A * | 8/1999 | Shimizu | ............... | G06K 7/1491 235/454 |
| 6,267,293 B1 * | 7/2001 | Dwinell | .................. | G06K 7/14 235/454 |
| 8,640,952 B2 * | 2/2014 | Wang | .................. | G06K 7/1417 235/375 |
| 9,361,499 B2 | 6/2016 | Bachelder et al. | | |

(Continued)

*Primary Examiner* — Paultep Savusdiphol
(74) *Attorney, Agent, or Firm* — Shook, Hardy & Bacon, L.L.P.

(57) ABSTRACT

Systems, methods, and computer-readable storage media are provided reconstructing barcode signals utilizing sequence alignment matrices. A barcode signal is received that is associated with a portion of a barcode symbol and includes a sequence of bar elements and space elements in alternating order. A sequence alignment matrix (SAM) is built such that each row represents an element of an already reconstructed portion of the barcode symbol, each column represents an element of the received barcode signal sequence, and the potential alignments are placed on a plurality of diagonals thereof. A score is assigned to each matrix square that includes an element of the received barcode signal sequence and a diagonal score is calculated for each of the plurality of diagonals by summing the scores for each matrix square respectively comprising each of the plurality of diagonals.

26 Claims, 10 Drawing Sheets

(56) References Cited

U.S. PATENT DOCUMENTS

| | | | | |
|---|---|---|---|---|
| 2012/0181336 A1* | 7/2012 | Wang | ............... | G06K 7/1417 |
| | | | | 235/437 |
| 2012/0256001 A1* | 10/2012 | Deppieri | ............... | G06K 7/14 |
| | | | | 235/462.41 |
| 2016/0104022 A1* | 4/2016 | Negro | ............... | G06K 7/1452 |
| | | | | 235/462.16 |

* cited by examiner

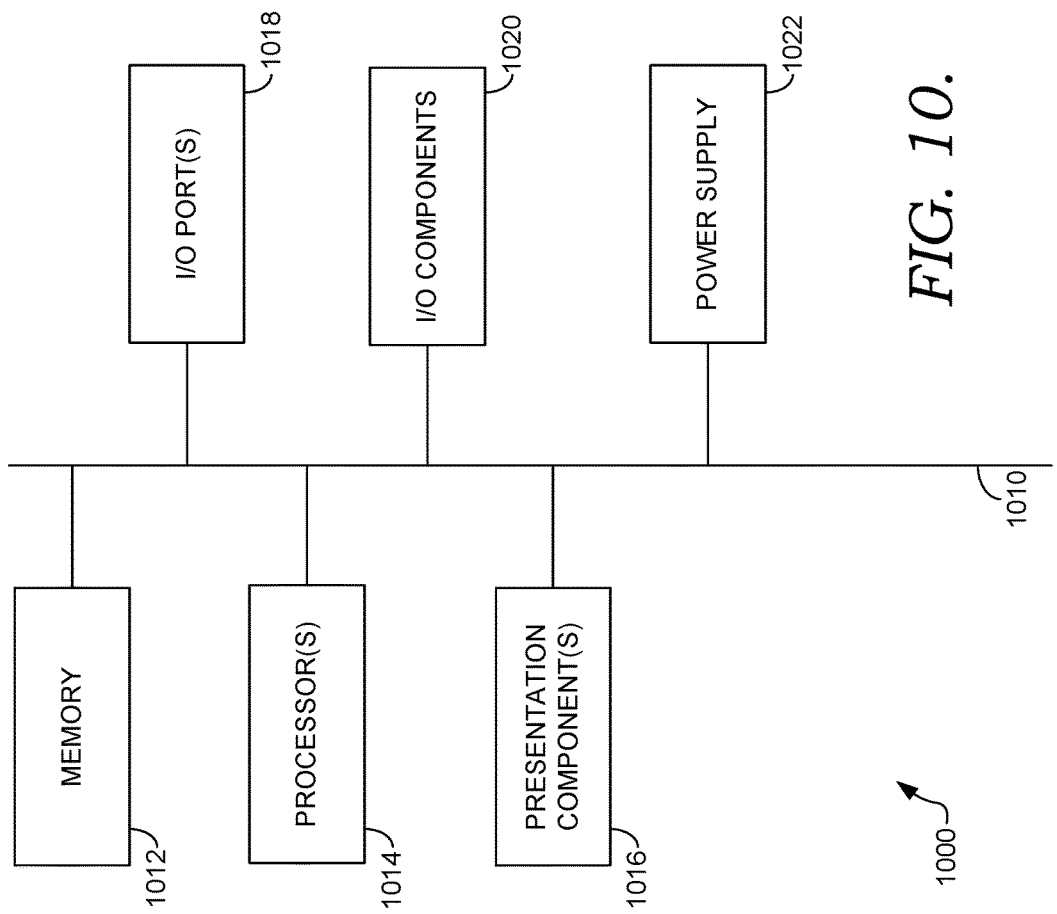

US 10,083,334 B2

BARCODE RECONSTRUCTION UTILIZING A SEQUENCE ALIGNMENT MATRIX

CROSS-REFERENCE TO RELATED APPLICATIONS

This application is related by subject matter to U.S. patent application Ser. No. 15/370,701, entitled "In-Field Data Acquisition and Formatting", and U.S. patent application Ser. No. 15/370,709, entitled "Predictive Anomaly Detection", each of which is being filed on even date herewith and each of which is hereby incorporated by reference as if set forth in its entirety herein.

BACKGROUND

Traditional means for reading barcodes involve a laser beam crossing over a barcode symbol from its beginning to its end. More advanced means for reading barcodes eliminate the need for a laser beam to completely traverse a barcode symbol in favor of acquiring a plurality of partial signals and reconstructing them to form the complete symbol. In addition to finding start signal portions and pure decoding, the crux of the reconstruction process is the matching task that, through an often complex set of heuristic rules, identifies a portion of the already partially reconstructed barcode symbol to match element-by-element, according to defined criteria, with a comparable acquired partial barcode signal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for reconstructing barcode signals utilizing sequence alignment matrices. A barcode signal is received, for instance, from a laser barcode reader. The barcode signal is associated with a portion of a linear barcode symbol and includes a sequence of bar elements and space elements in alternating order. A sequence alignment matrix (SAM) is built such that each row of the SAM represents an element (bar or space) of an already reconstructed portion of the linear barcode symbol, each column of the SAM represents an element of the received barcode signal sequence, and the potential alignments between the elements of the received barcode signal sequence and the elements of the already reconstructed portion of the linear barcode symbol are placed on a plurality of diagonals thereof. A score is assigned to each matrix square (i.e., matrix entry) that includes an element of the received barcode signal sequence and a diagonal score is calculated for each of the plurality of diagonals by summing the scores for each matrix square respectively comprising each of the plurality of diagonals.

Where split and/or merge conditions are encountered, a potential alignment may be identified that includes a portion of the matrix squares from more than one of the plurality of diagonals. In such an instance, a potential alignment score may be calculated by summing the scores for each matrix square respectively comprising the identified potential alignment. In accordance with aspects hereof, the diagonal score or potential alignment score having the highest numerical value may be selected and all aligned elements (that is, excluding the non-matching elements) comprising the associated diagonal or potential alignment may be utilized to reconstruct at least a portion of the linear barcode symbol.

BRIEF DESCRIPTION OF THE DRAWINGS

The present invention is illustrated by way of example and not limitation in the accompanying figures in which like reference numerals indicate similar elements and in which:

FIG. 10 is a block diagram of an exemplary computing environment suitable for use in implementing embodiments of the present invention.

DETAILED DESCRIPTION

Figure 1:
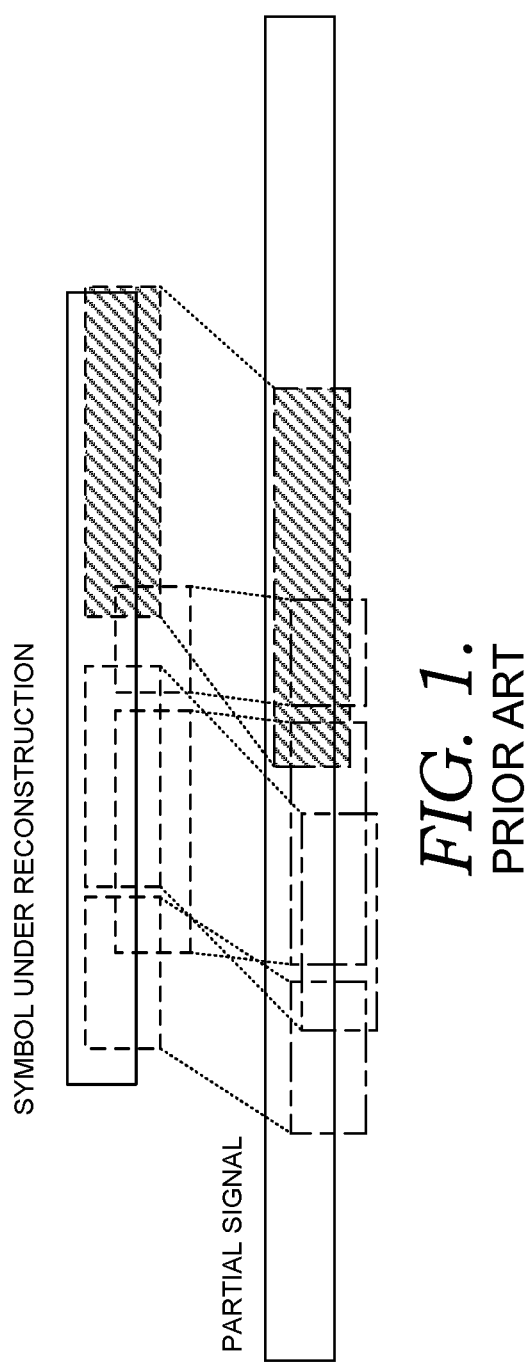
FIG. 1 is a schematic diagram of a prior art method for aligning partial barcode signal sequences with an already reconstructed portion (or start sequence) of a barcode symbol/label.

The subject matter of aspects of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Barcode readers employing Advanced Code Reconstruction (ACR) reconstruct barcode symbols from partial signal sequences. Due to the inherent need for matching or aligning portions of already partially reconstructed barcode symbols (or start sequences) with partial barcode signal sequences element-by-element, mismatch conditions due to split sequences or merge sequences can lead to poor reconstruction performance. "Split sequences" are sequences in which one element splits to become multiple elements. Contrarily, "merge sequences" are sequences in which multiple elements merge into a single element. Split and merge sequence phenomena lead to conditions where more than one alignment is possible and, accordingly, lead to poor barcode reader performance as barcode symbols may be incorrectly reconstructed. Aspects of the present invention provide an alternative methodology to properly reconstruct barcode symbols from received partial barcode sequences and, accordingly, aid in improving barcode reader performance.

Various aspects of the technology described herein generally are directed to systems, methods, and computer-readable storage media for reconstructing barcode signals utilizing sequence alignment matrices and a custom quality index measure. A custom quality index measure in accordance with embodiments of the present invention does not originate from a "verification system," as that term is utilized by one of ordinary skill in the art. Typically, verification systems consist of machine vision software with proper illumination developed to assess "barcode readability" and also take into account that marking and labeling systems degrade over time. Verification systems are more costly and accurate than standard barcode readers at identifying low-quality barcodes. Moreover they must be compliant with published barcode quality standards (1D and 2D barcodes), such as ISO 15415, ISO 15416, and AIM DPM/ISO 29158.

Nevertheless, in some cases, depending on the requirements of a particular application or organization, needs may also be satisfied by a more simple and economic solution: a standard barcode reader equipped with a special tool capable of classifying every barcode with an arbitrary but reliable metric (i.e., a significant and repeatable measure). This kind of "custom verification," in accordance with embodiments of the present invention, at least for a particular intended application, can provide objective measurements for actual barcode ease-of-reading.

Embodiments of the present invention generally are directed to systems, methods, and computer-readable storage media for reconstructing barcode signals utilizing sequence alignment matrices. A barcode signal is received, for instance, from a laser barcode reader. The barcode signal is associated with a portion of a linear barcode symbol and includes a sequence of bar elements and space elements in alternating order. A sequence alignment matrix (SAM) is built such that each row of the SAM represents an element (bar or space) of an already reconstructed portion of the linear barcode symbol (or a start sequence), each column of the SAM represents an element of the received barcode signal sequence, and the potential alignments of the elements of the received barcode signal sequence and the elements of the already reconstructed portion of the linear barcode symbol are placed on a plurality of diagonals thereof. (It should be noted that the rows and columns may be oppositely aligned, such that the matrix rows represent elements of a received barcode signal sequence and columns represent elements of an already reconstructed portion of the linear barcode symbol, within the scope of embodiments hereof.) A score is assigned to each matrix square (i.e., matrix entry) that includes an element of the received barcode signal sequence, the matrix square score indicating whether or not there is element alignment at that square. A diagonal score is calculated for each of the plurality of diagonals by summing the scores for each matrix square respectively comprising each of the plurality of diagonals.

Where split and/or merge conditions are encountered, a potential alignment may be identified that includes a portion of the matrix squares from more than one of the plurality of diagonals. In such an instance, a potential alignment score may be calculated by summing the scores for each matrix square respectively comprising the identified potential alignment. In accordance with aspects hereof, the diagonal score or potential alignment score having the highest numerical value may be selected and all aligned/matching elements (i.e., excluding non-matching elements) comprising the associated diagonal or potential alignment may be utilized to reconstruct at least a portion of the linear barcode symbol.

Accordingly, exemplary embodiments are directed to methods performed by one or more computing devices including at least one processor, the methods for reconstructing barcode signals utilizing sequence alignment matrices. An exemplary method comprises: (a) receiving a barcode signal, the barcode signal being associated with a portion of a first linear barcode symbol and including a sequence of bar elements and space elements in alternating order; (b) diagonally aligning the sequence on a sequence alignment matrix comprised of a plurality of matrix squares such that: each matrix row represents an element in a reconstructed portion of the first linear barcode symbol, each matrix column represents an element of the received barcode signal sequence, and the received barcode signal sequence is sequentially aligned on a plurality of diagonals of the sequence alignment matrix such that each of the plurality of diagonals represents a potential alignment of the elements of the received barcode signal sequence and the elements of the reconstructed portion of the first linear barcode symbol; (c) assigning a score to each matrix square that includes an element of the sequence, the matrix square score indicating whether or not there is element alignment at that square; and (d) calculating a score for each of the plurality of diagonals by summing the scores for each matrix square respectively comprising each of the plurality of diagonals.

Other exemplary embodiments are directed to one or more computer-readable storage media storing computer-useable instructions that, when used by one or more computing devices, cause the one or more computing devices to perform a method for reconstructing barcode signals utilizing sequence alignment matrices. An exemplary method comprises: (a) receiving a plurality of successive laser barcode signals, each of the plurality of barcode signals being associated with a portion of a first linear barcode symbol and including a sequence of bar elements and space elements in alternating order; (b) for each of the plurality of successive laser barcode signals, diagonally aligning the sequence on a sequence alignment matrix comprised of a plurality of matrix squares such that: each matrix row represents an element in a reconstructed portion of the first linear barcode symbol, each matrix column represents an element of the received barcode signal sequence for one of the plurality of successive laser barcode signals, and the received barcode signal sequence is sequentially aligned on a plurality of diagonals of the sequence alignment matrix such that each of the plurality of diagonals represents a potential alignment of the elements of the received barcode signal sequence and the elements of the reconstructed portion of the first linear barcode signal; (c) for each of the plurality of successive laser barcode signals, assigning a score to each matrix square that includes an element of the sequence, the matrix square score indicating whether or not there is element alignment at that square; and; (d) for each of the plurality of successive laser barcode signals, calculating a score for each of the plurality of diagonals by summing the scores for each matrix square respectively comprising each of the plurality of diagonals; and (e) for each of the plurality of successive laser barcode signals received, updating the reconstructed portion of the first linear barcode symbol utilizing the aligned/matched bar elements and space elements (i.e., excluding non-matching elements) comprising the one of the plurality of diagonals that has the highest numerical score.

Still other exemplary embodiments are directed to barcode readers for reconstructing barcode signals utilizing sequence alignment matrices. An exemplary barcode reader comprises: (a) a signal receiving component configured for receiving a barcode signal, the barcode signal being associated with a portion of a first linear barcode symbol and including a sequence of bar elements and space elements in alternating order; (b) an aligning component configured for diagonally aligning the sequence on a sequence alignment matrix comprised of a plurality of matrix squares such that: each row of matrix squares represents an element in a reconstructed portion of the first linear barcode symbol, each column of matrix squares represents an element of the received barcode signal sequence, and the received barcode signal sequence is sequentially aligned on a plurality of diagonals of the sequence alignment matrix such that each of the plurality of diagonals represents a potential alignment of the elements of the received barcode signal sequence and elements of the reconstructed portion of the first linear barcode symbol; (c) a matrix square scoring component configured for assigning a matrix square score to each matrix square that includes an element of the received barcode signal sequence, each matrix square score indicating whether or not there is element alignment at that matrix square; and (d) a calculating component configured for calculating a diagonal score for each of the plurality of diagonals by summing the scores for each matrix square respectively comprising each of the plurality of diagonals.

With reference now to FIG. 1, a schematic diagram is illustrated showing a prior art method for aligning partial barcode signal sequences with an already reconstructed portion (or start sequence) of a barcode symbol/label. During each matching call (that is, when a barcode signal is received that is associated with a portion of a barcode symbol and includes a sequence of bar elements and space elements in alternating order), an already reconstructed portion of the barcode symbol (or a start sequence) will attempt to match, element by element, with a compatible piece of the received partial barcode signal sequence. In this instance, compatibility is defined by both a duration tolerance criterion (e.g., an at least approximately equivalent numerical element count) and a position tolerance criterion (e.g., the received partial barcode signal sequence is not spatially too far away from the already reconstructed portion of the barcode symbol). Moreover, each match or alignment, to be valid, generally includes a minimum length in terms of consecutive compatible elements. In FIG. 1, a typical multiple match condition is represented wherein many length, alignments, cross-intersections, and overlapping conditions are possible.

When multiple match conditions arise, the following heuristic rules may be applied, in the listed order, to the set of compatible matches:

(1) If only one match exists, it will be used.

(2) If more than one match exists, all overlapping matches will be removed with the exception of the longest remaining sequence of consecutive matching elements, which will be used. In the case of equal length, the match that is closest in terms of position error will be used.

(3) Among the non-overlapping matches remaining, use the longest in terms of length of consecutive matching elements or the match that is closest in terms of position error in the case of equal length.

It should be noted that in the prior art matching methodology illustrated, only a single alignment/match will be selected—the shaded match in FIG. 1. Additionally, only the corresponding matching portion will be utilized to try to update the barcode label/symbol under reconstruction.

Figure 2:
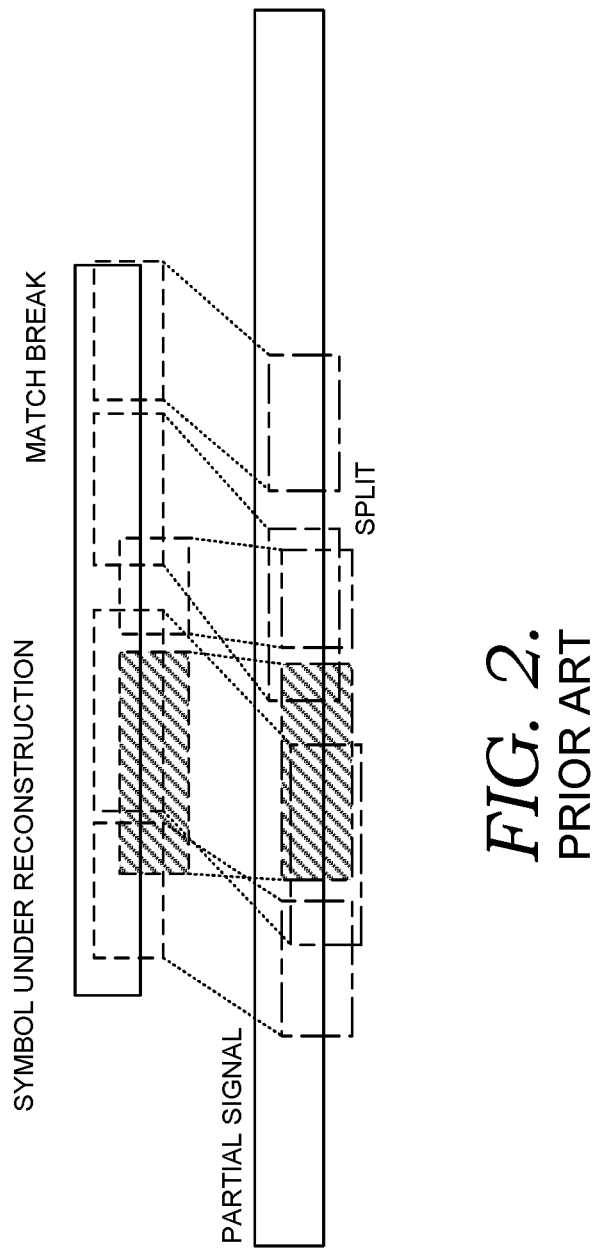
FIG. 2 is a schematic diagram of a prior art method for aligning partial barcode signal sequences with an already reconstructed portion (or start sequence) of a barcode symbol/label when mismatch conditions (e.g., splits and/or match or alignment breaks) occur.

With reference to FIG. 2, illustrated is a schematic diagram of a prior art method for aligning partial barcode signal sequences with an already reconstructed portion of a barcode symbol/label (or start sequence) when mismatch conditions occur (e.g., it does not meet the duration tolerance criterion). Note that utilizing the same heuristic rules described above with reference to FIG. 1, a different match will be selected—the shaded match in FIG. 2.

Aspects of the present invention provide an alternate methodology for properly reconstructing barcode symbols from received partial barcode signal sequences and, accordingly, aid in improving barcode reader performance. The alternate methodology takes some of its inspiration from bioinformatics. In bioinformatics, a "sequence alignment" is a way of arranging sequences of DNA, RNA, or protein to identify regions of similarity that may be a consequence of functional, structural, or evolutionary relationships between the sequences. Aligned sequences of nucleotide or amino acid residues typically are represented as rows in a matrix. Gaps are inserted between the residues so that identical or similar characters are aligned in successive columns. Every entry in the resultant Sequence Alignment Matrix (SAM) includes an assigned score.

In accordance with aspects of the present invention, barcode symbols are reconstructed from received partial barcode signal sequences utilizing a SAM. The same compatibility criteria concerning duration tolerance and position tolerance discussed with respect to the prior art methods above are utilized but no heuristic rules are applied. Instead, a new scoring metric, well suited for the intrinsic nature of a barcode signal, is used to exploit data patterns in the SAM.

Since many intrinsic difference do exist between a barcode signal sequence (element count array) and a biological genetic sequence, some considerations need to be taken into account and, as a consequence, some constraints about the SAM building and analysis need to be exploited:

(1) Element mismatches are also possible with barcodes.

(2) Element gaps are not possible with barcodes.

(3) Element deletions and insertions are not possible with barcodes. Instead, element split and merge conditions are possible.

Figure 3:
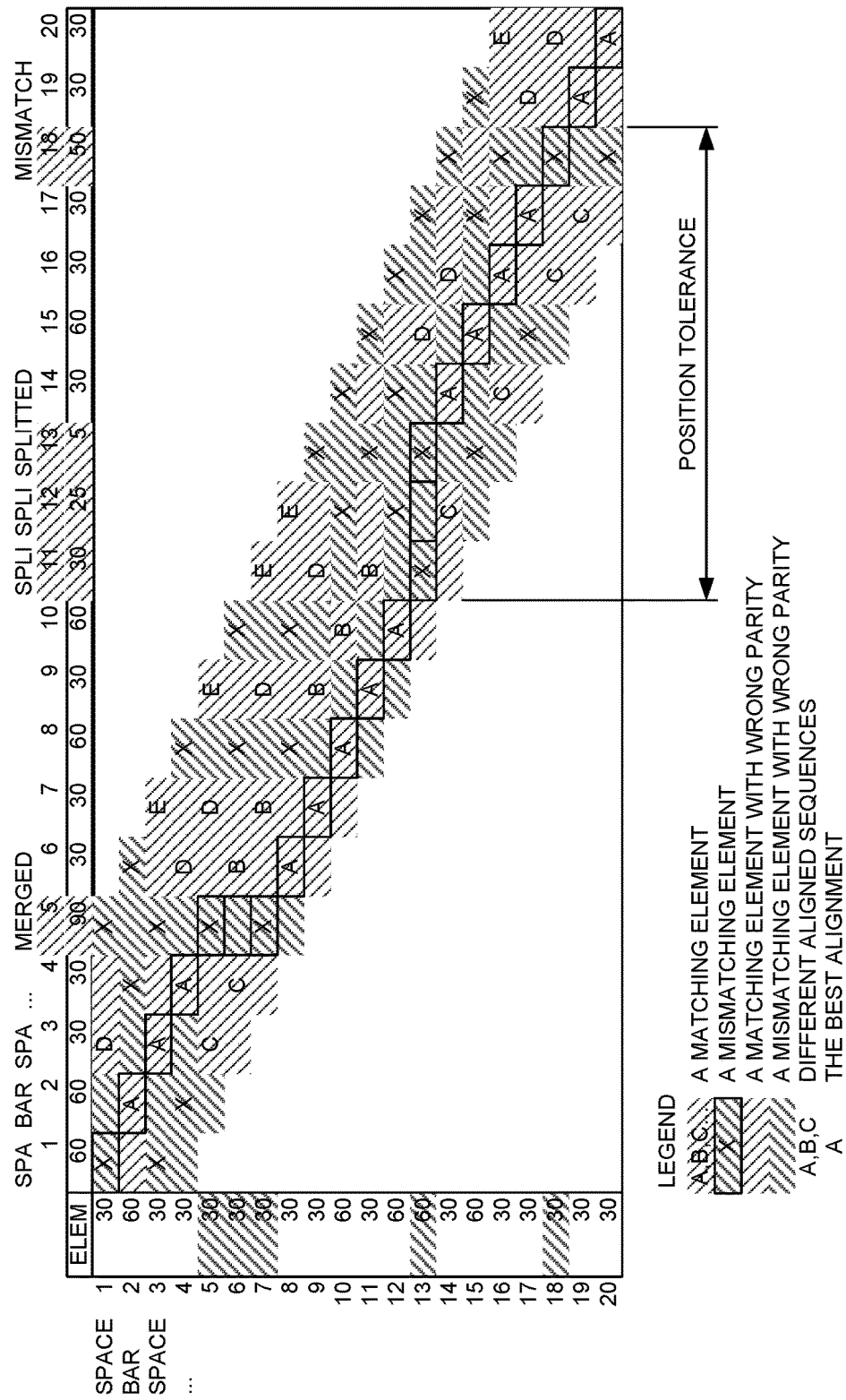
FIG. 3 is a schematic diagram illustrating alignment of a partial barcode signal with an already reconstructed portion of a barcode symbol/label utilizing a Sequence Alignment Matrix (SAM), in accordance with exemplary embodiments of the present invention.

With reference to FIG. 3, illustrated is a schematic diagram showing alignment of a partial barcode signal sequence having an already reconstructed portion of a barcode symbol/label utilizing a SAM, in accordance with exemplary embodiments of the present invention. In the illustrated instance, merge, split and mismatch conditions are illustrated and five (5) different possible alignments, labeled A-E, are shown. The expected "best" alignment is illustrated surrounded by black-edge rectangles and is labeled "A".

In accordance with embodiments of the present invention, each row of matrix squares represents an element in a reconstructed portion of a barcode symbol. Each column of matrix squares represents an element of a received partial barcode signal sequence. A received partial barcode signal sequence is sequentially aligned on a plurality of diagonals of the SAM such that each of the plurality of diagonals represents a potential alignment/match of the elements of the received partial barcode signal sequence and the elements of the reconstructed portion of the barcode symbol. Diagonals are filled alternately and bar elements and space elements cannot change their parity. In aligning utilizing a SAM, only a sub-set of diagonals needs to be filled and analyzed (within the position tolerance). A mismatch condition results in a match-break in a diagonal, a merge condition results in a short sequence of vertical non-matching elements, and a split condition results in a short sequence of horizontal non-matching elements. Subsequent to encountering a merge condition or a split condition, an alignment sequence switches from a first diagonal to a second diagonal.

In order to determine the "best" alignment utilizing a SAM in accordance with embodiments of the present invention, a scoring system is utilized wherein a matrix square score is assigned to each matrix square that includes an element of a received partial barcode signal sequence, the matrix square score indicating whether or not there is element alignment at that matrix square. For each of the plurality of diagonals, a progressive positive integer, beginning with number one (1), is assigned to each sequential matrix square having a matching element between the elements of the reconstructed portion of the barcode symbol under reconstruction and the elements of the received partial barcode signal sequence. For each of the plurality of diagonals, a value of zero (0) is assigned to each matrix square that does not have a matching element between the elements of the reconstructed portion of the barcode symbol under reconstruction and the elements of the received partial barcode signal sequence. A value of one (1) is then assigned to each matrix square that follows a matrix square having an assigned value of zero (0).

After assigning scores to each matrix square that includes an element of a received partial barcode signal sequence, a diagonal score is calculated for each of the plurality of diagonals containing element alignments. The diagonal score is calculated by summing the scores of all matrix squares comprising the diagonal. In the case of a merge condition or a split condition, a potential alignment computation may be forked. That is, a first partial potential alignment score may be calculated by summing the matrix square scores for a portion of the matrix squares comprising a first of the plurality of diagonals, the portion terminating upon encountering an endpoint of one of an element split subsequence or an element merge subsequence. Subsequently, alignment may be switched to a second of the plurality of diagonals, the second of the plurality of diagonals including an opposing endpoint of the one of the element split subsequence or the element merge subsequence. A second partial potential alignment score may be calculated for the potential alignment by summing the matrix square scores for a portion of the matrix squares comprising the second of the plurality of diagonals, the portion originating at the opposing endpoint of the one of the element split subsequence or the element merge subsequence. The first and second partial scores may be summed to arrive at the potential alignment score.

Figure 4:
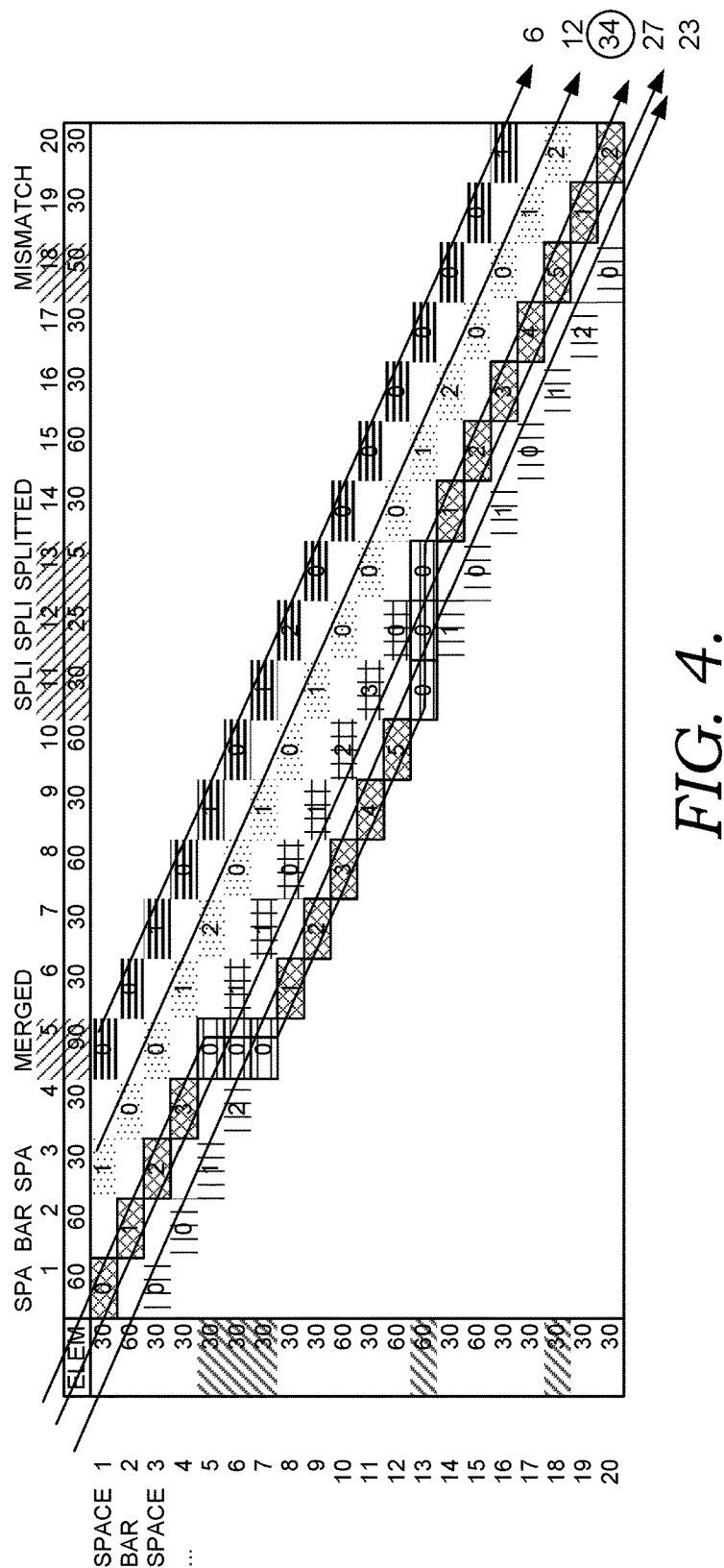
FIG. 4 is a schematic diagram illustrating diagonal and partial alignment scoring for an alignment of a partial barcode signal sequence with an already reconstructed portion of a barcode symbol/label utilizing a SAM, in accordance with exemplary embodiments of the present invention.

In accordance with embodiments of the present invention, the diagonal score or partial alignment score having the highest numerical value may be selected for updating the barcode symbol under reconstruction. Unlike prior art methods, all aligned elements (i.e., excluding non-matching elements) comprising the selected updating sequence may be utilized for reconstruction. An exemplary SAM constructed utilizing the principles described herein is illustrated in FIG. 4. Note that the "best" alignment (and thus the alignment that is selected for reconstruction of the barcode symbol) comprises elements from multiple diagonals that result in a potential alignment score of 34, while the diagonal scores sum to 6, 12, 27 and 23, respectively.

Figure 5:
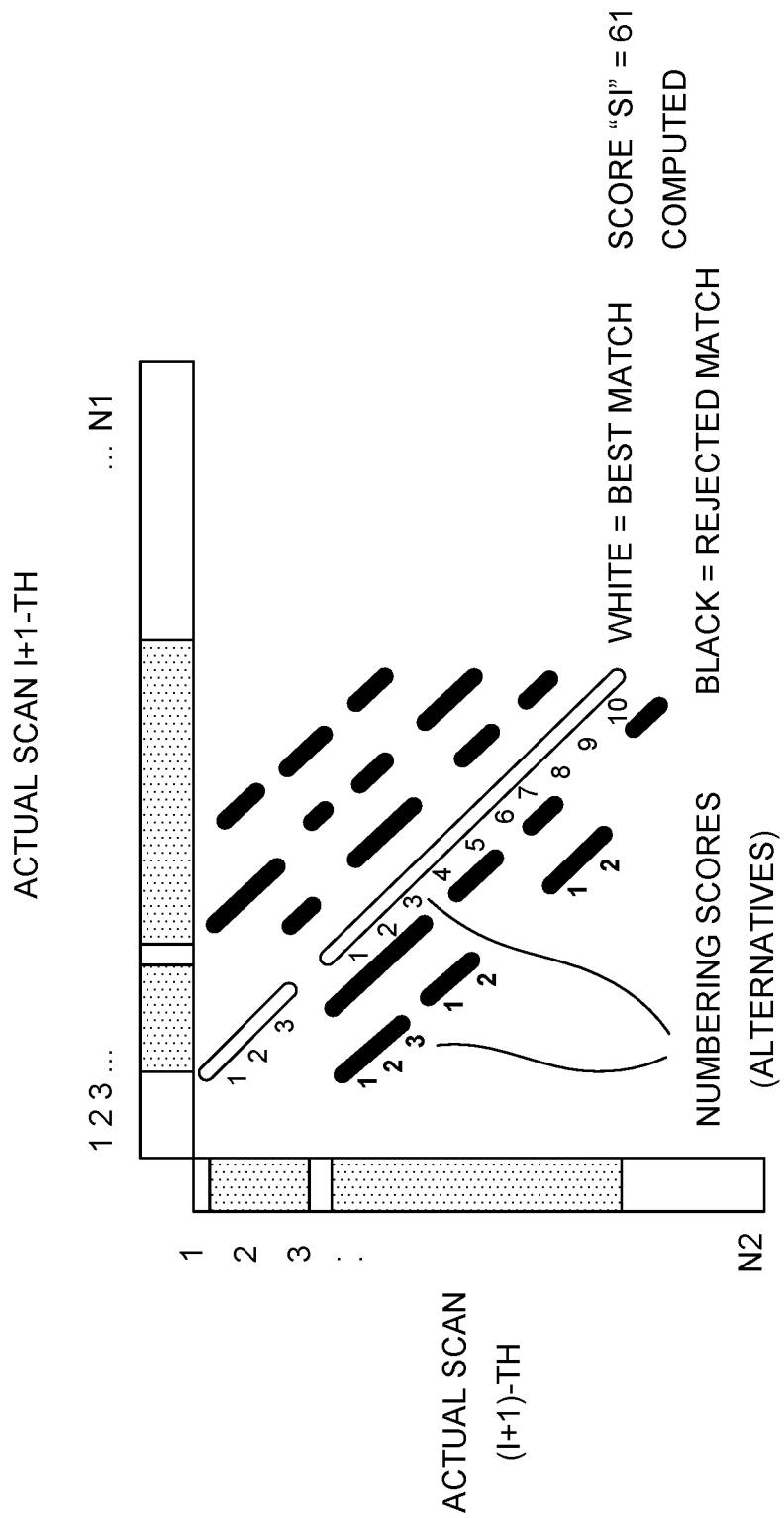
FIG. 5 is a schematic diagram illustrating diagonal scoring for an alignment of a partial barcode signal sequence with an already reconstructed portion of a barcode symbol/label utilizing a SAM, in accordance with exemplary embodiments of the present invention.

FIG. 5 is a schematic diagram illustrating diagonal scoring for an alignment of a partial barcode signal sequence with an already reconstructed portion of a barcode symbol/label utilizing a SAM, in accordance with exemplary embodiments of the present invention. Note that in the illustrated figure, the SAM is void of merge or split conditions and, accordingly, the diagonal score having the highest numerical value is selected for barcode symbol reconstruction.

In addition to being utilized to select alignments for reconstructing barcodes from partial barcode signals, a scoring metric as described herein may be utilized to provide an objective measurement of barcode quality. Moreover, a real-time computation of a barcode quality indicator, in accordance with embodiments of the present invention may aid customers in avoiding productivity losses and in identifying defects in barcode labels.

As a natural consequence of the score calculation discussed herein above, the maximum expected score in the case of N-length i-th sequence is defined by the Gauss' formula:

$$MAX(si(N))=1+2+\ldots+N=N(N+1)/2.$$

$$MIN(si(N))=0$$

From this process, the following formula may be utilized to calculate a global score resulting from multiple partial barcode signal alignments.

$$S = \frac{2}{K}\sum_{i=1}^{K}\frac{si}{Ni(Ni+1)} \leftarrow [0 \ldots 1]$$

The global score is calculated by averaging over K alignments, the local scores (si) and normalizing all the values between a [0 . . . 1] interval (as opposed to the superior limit of N(N+1)/2). The global score may be utilized as an intuitive, percentage-based barcode quality index measure.

Figure 6:
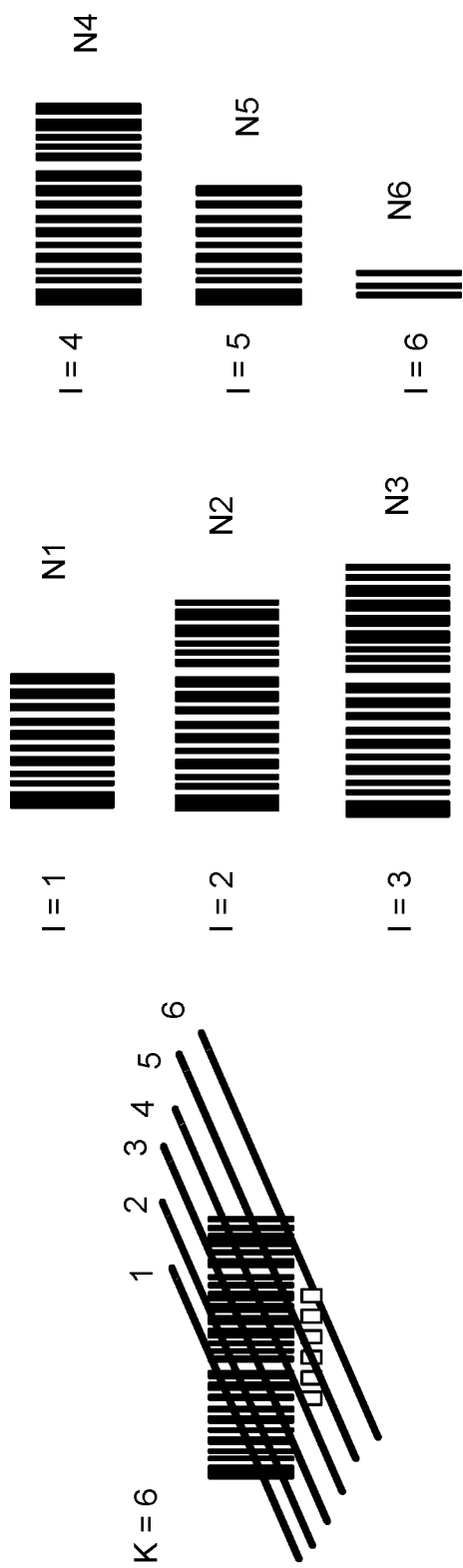
FIG. 6 is a schematic diagram illustrating an exemplary method of reconstructing a barcode symbol/label from a plurality of partial signal sequences, in accordance with exemplary embodiments of the present invention.

For laser barcode readers, for every reconstructed label, a method in accordance with embodiments of the present invention consists of collecting all the local scores resulting from partial barcode signal alignment over the total number of partial alignments (K), along with the total number of elements involved in every alignment (Ni). This local score information (si) may be retained during reconstruction in order to be utilized in computing a global score (S). This process is illustrated in the schematic diagram of FIG. 6.

Figure 7:
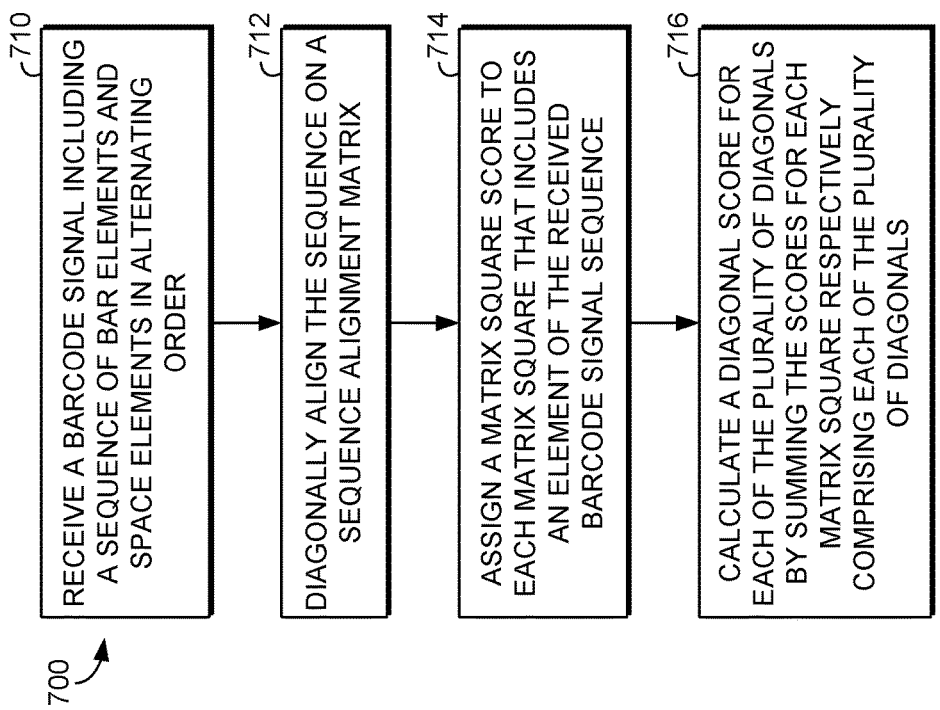
FIG. 7 is a flow diagram illustrating an exemplary method for reconstructing barcode signal sequences utilizing SAMs, in accordance with exemplary embodiments of the present invention.

With reference now to FIG. 7, illustrated is a flow diagram showing an exemplary method 700 for reconstructing barcode signals utilizing sequence alignment matrices, in accordance with exemplary embodiments of the present invention. As indicated at block 710, a barcode signal is received, the barcode signal being associated with a portion of a first linear barcode symbol and including a sequence of bar elements and space elements in alternating order. As indicated at block 712, the sequence of bar elements and space elements comprising the received barcode signal is diagonally aligned on a sequence alignment matrix comprised of a plurality of matrix squares such that: (a) each row of matrix squares represents an element in a reconstructed portion of the first linear barcode symbol, (b) each column of matrix squares represents an element of the received barcode signal sequence, and (c) the received barcode signal sequence is sequentially aligned on a plurality of diagonals of the sequence alignment matrix such that each of the plurality of diagonals represents a potential alignment of the elements of the received barcode signal sequence and elements of the reconstructed portion of the first linear barcode symbol. As indicated at block 714, a matrix square score is assigned to each matrix square that includes an element of the received barcode signal sequence, each matrix square score indicating whether or not there is element alignment at that matrix square. As indicated at block 716, a diagonal score is calculated for each of the plurality of diagonals by summing the scores for each matrix square respectively comprising each of the plurality of diagonals.

Figure 8:
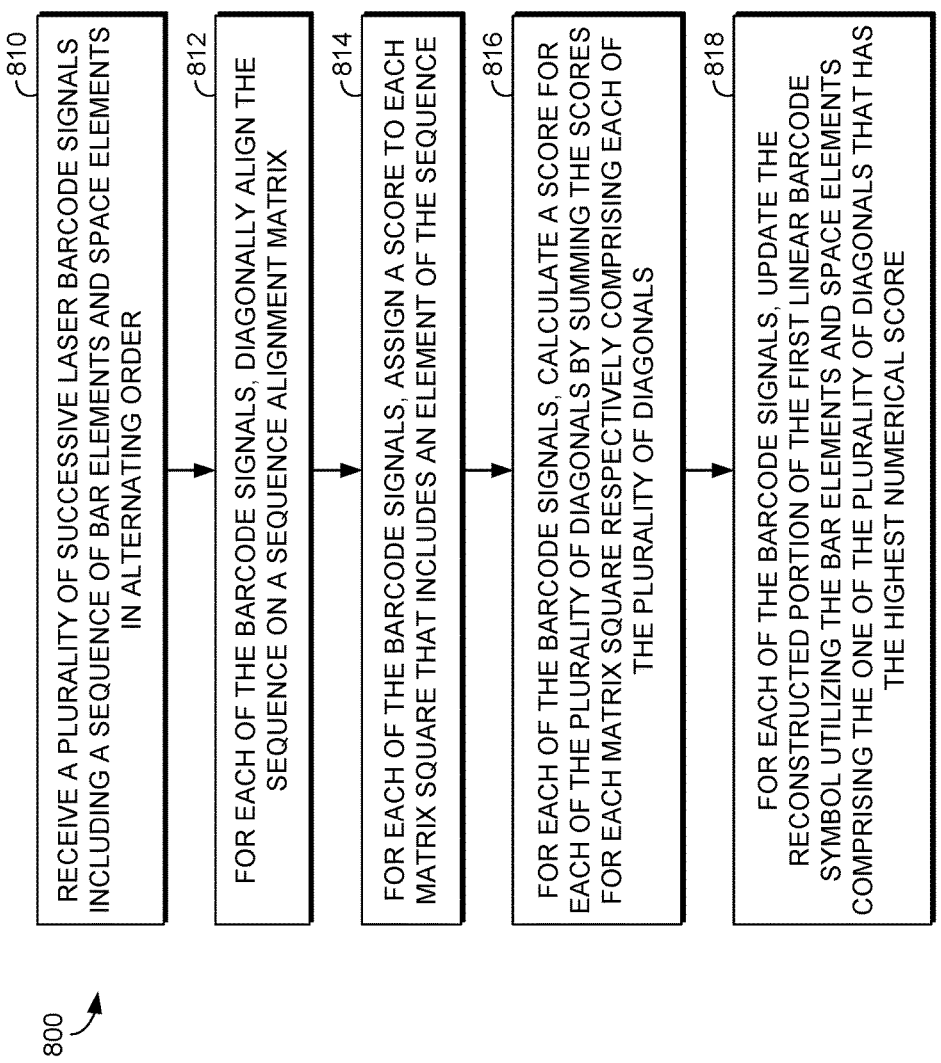
FIG. 8 is a flow diagram illustrating another exemplary method for reconstructing barcode signal sequences utilizing SAMs, in accordance with exemplary embodiments of the present invention.

Turning to FIG. 8, illustrated is a flow diagram showing another exemplary method 800 for reconstructing barcode signals utilizing sequence alignment matrices, in accordance with exemplary embodiments of the present invention. As indicated at block 810, a plurality of successive laser barcode signals is received, each of the plurality of barcode signals being associated with a portion of a first linear barcode symbol and including a sequence of bar elements and space elements in alternating order. As indicated at block 812, for each of the plurality of successive laser barcode signals, diagonally aligning the sequence on a sequence alignment matrix comprised of a plurality of matrix squares such that: (a) each row of matrix squares represents an element in a reconstructed portion of the first linear barcode symbol, (b) each column of matrix squares represents an element of the received barcode signal sequence, and (c) the received barcode signal sequence is sequentially aligned on a plurality of diagonals of the sequence alignment matrix such that each of the plurality of diagonals represents a potential alignment of the elements of a received barcode signal sequence and elements of the reconstructed portion of the first linear barcode symbol. As indicated at block 814, for each of the plurality of successive laser barcode signals, a score is assigned to each matrix square that includes an element of the sequence, the matrix square score indicating whether or not there is element alignment at that square. As indicated at block 816, for each of the plurality of successive laser barcode signals, a score is calculated for each of the plurality of diagonals by summing the scores for each matrix square respectively comprising each of the plurality of diagonals. As indicated at block 818, for each of the plurality of successive laser barcode signals received, the reconstructed portion of the first linear barcode symbol is updated utilizing the bar elements and space elements comprising the one of the plurality of diagonals that has the highest numerical score.

Figure 9:
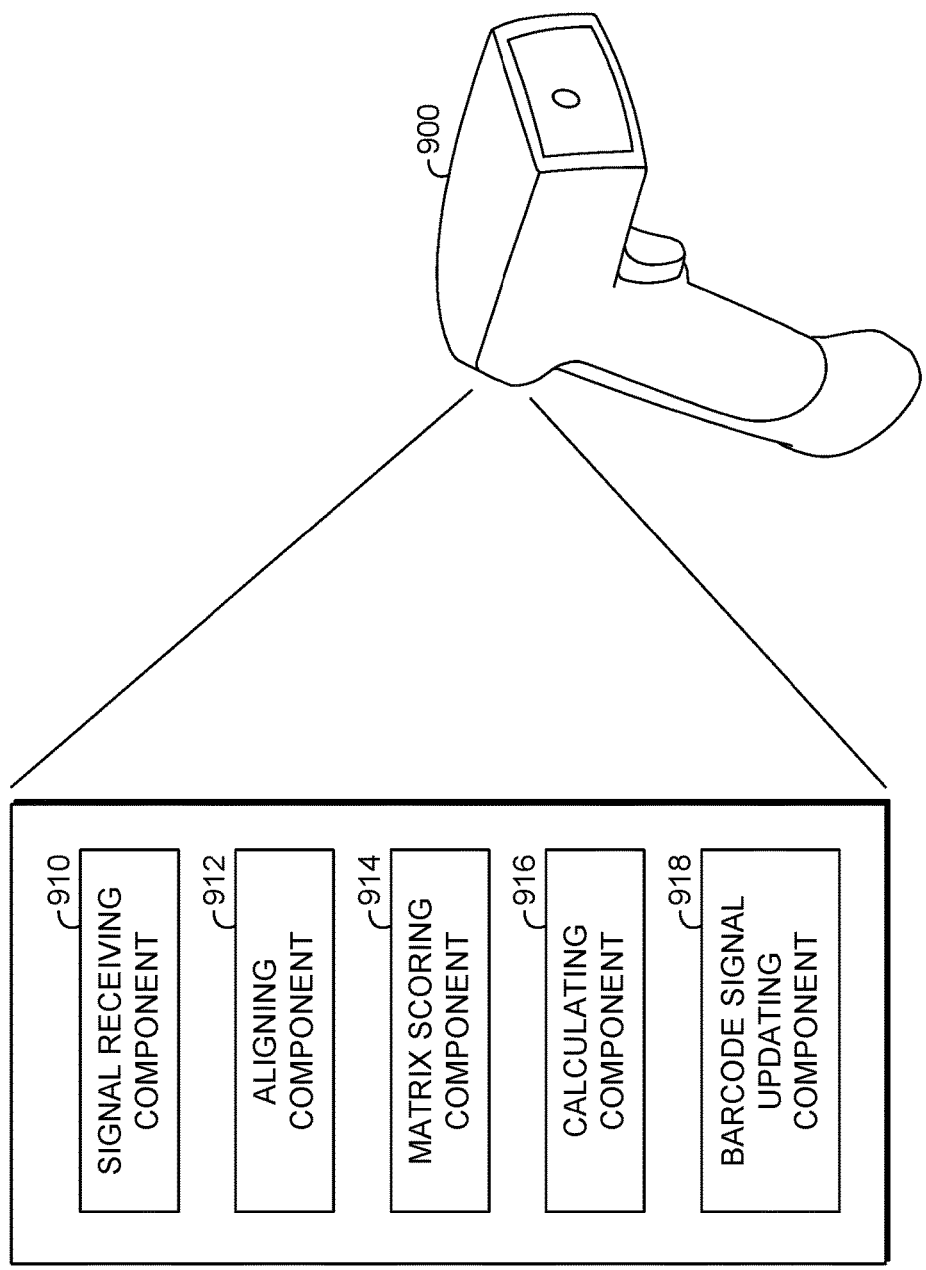
FIG. 9 is a schematic diagram illustrating an exemplary barcode reader that may be utilized in accordance with exemplary embodiments of the present invention.

FIG. 9 is a schematic diagram illustrating an exemplary barcode reader 900 that may be utilized in accordance with exemplary embodiments of the present invention. The illustrated barcode reader 900 includes a signal receiving component 910, an aligning component 912, a matrix scoring component 914, a calculating component 916, and a barcode signal updating component 918. The signal receiving component 910 is configured for receiving a barcode signal, the barcode signal being associated with a portion of a first linear barcode symbol and including a sequence of bar elements and space elements in alternating order.

The aligning component 912 is configured for diagonally aligning the sequence on a sequence alignment matrix comprised of a plurality of matrix squares. In embodiments, the sequence is aligned such that: (1) each row of matrix squares represents an element in a reconstructed portion of the first linear barcode symbol, (2) each column of matrix squares represents an element of the received barcode signal sequence, and (3) the received barcode signal sequence is sequentially aligned on a plurality of diagonals of the sequence alignment matrix such that each of the plurality of diagonals represents a potential alignment of the elements of the received barcode signal sequence and elements of the reconstructed portion of the first linear barcode symbol.

The matrix square scoring component 914 is configured for assigning a matrix square score to each matrix square that includes an element of the received barcode signal sequence, each matrix square score indicating whether or not there is element alignment at that matrix square.

The calculating component 916 is configured for calculating a diagonal score for each of the plurality of diagonals by summing the scores for each matrix square respectively comprising each of the plurality of diagonals. In embodiments, the calculating component 916 is further configured to calculate a potential alignment score for a potential element alignment that includes matrix squares from at least two of the plurality of diagonals, wherein the potential alignment score is calculated by: (1) calculating a first partial potential alignment score for the potential element alignment by summing the matrix square scores for a portion of the matrix squares comprising a first of the plurality of diagonals, the portion terminating upon encountering an endpoint of one of an element split subsequence or an element merge subsequence; (2) switching alignment to a second of the plurality of diagonals, the second of the plurality of diagonals including an opposing endpoint of the one of the element split subsequence or the element merge subsequence; (3) calculating a second partial potential alignment score for the potential alignment score by summing the matrix square scores for a portion of the matrix squares comprising the second of the plurality of diagonals, the portion originating at the opposing endpoint of the one of the element split subsequence or the element merge subsequence; and (4) summing the first partial score and the second partial score.

The barcode signal updating component 918 is configured for updating the reconstructed portion of the first linear barcode symbol utilizing the bar elements and space elements (excluding non-matching elements) comprising the matrix squares resulting in the diagonal score or the potential alignment score that has the highest numerical score.

Exemplary Operating Environment

Having briefly described an overview of embodiments of the present invention, an exemplary operating environment in which embodiments of the present invention may be implemented is described below in order to provide a general context for various aspects of the present invention. Referring to FIG. 10, an exemplary operating environment for implementing embodiments of the present invention is shown and designated generally as computing device 1000. The computing device 1000 is but one example of a suitable computing environment and is not intended to suggest any limitation as to the scope of use or functionality of embodiments of the invention. Neither should the computing device 1000 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including, but not limited to, hand-held devices, unattended scanning systems (e.g., laser-based or image-based) consumer electronics, general-purpose computers, more specialty computing devices, and the like. Embodiments of the invention may also be practiced in distributed computing environments where tasks are performed by remote-processing devices that are linked through a communications network.

With continued reference to FIG. 10, the computing device 1000 includes a bus 1010 that directly or indirectly couples the following devices: a memory 1012, one or more processors 1014, one or more presentation components 1016, one or more input/output (I/O) ports 1018, one or more I/O components 1020, and an illustrative power supply 1022. The bus 110 represents what may be one or more busses (such as an address bus, data bus, or combination thereof). Although the various blocks of FIG. 10 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

The computing device 1000 typically includes a variety of computer-readable media. Computer-readable media may be any available media that is accessible by the computing device 1000 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 1000. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1012 includes computer-storage media in the form of volatile and/or nonvolatile memory. The memory may be removable, non-removable, or a combination thereof. Exemplary hardware devices include solid-state memory, hard drives, optical-disc drives, and the like. The computing device 1000 includes one or more processors that read data from various entities such as the memory 1012 or the I/O components 1020. The presentation component(s) 1016 present data indications to a user or other device. Exemplary presentation components include a display device, speaker, printing component, vibrating component, and the like.

The I/O ports 1018 allow the computing device 1000 to be logically coupled to other devices including the I/O components 1020, some of which may be built in. Illustrative I/O components include a microphone, joystick, game pad, satellite dish, scanner, printer, wireless device, a controller, such as a stylus, a keyboard and a mouse, a natural user interface (NUI), and the like.

A NUI processes air gestures, voice, or other physiological inputs generated by a user. These inputs may be interpreted, for instance, as words or symbols appearing in programs and/or apps, and the like presented by the computing device 1000. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as, stereoscopic camera systems, infrared camera systems, RGB camera systems, and combinations of these for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices. The computer-useable instructions form an interface to allow a computer to react according to a source of input. The instructions cooperate with other code segments to initiate a variety of tasks in response to data received in conjunction with the source of the received data.

Exemplary Features having Multiple Dependency:

As used herein and in connection with the features listed hereinafter, the terminology "any of features" or similar variations of said terminology is intended to be interpreted such that features may be combined in any combination. For example, an exemplary feature 4 may indicate the method/apparatus of any of features 1 through 3, which is intended to be interpreted such that elements of feature 1 and feature 4 may be combined, elements of feature 2 and feature 4 may be combined, elements of feature 3 and 4 may be combined, elements of features 1, 2, and 4 may be combined, elements of features 2, 3, and 4 may be combined, elements of features 1, 2, 3, and 4 may be combined, and/or other variations. Further, the terminology "any of features" or similar variations of said terminology is intended to include "any one of features" or other variations of such terminology, as indicated by some of the examples provided above.

Feature 1: A method being performed by one or more computing devices including at least one processor, the method for reconstructing barcode signals utilizing sequence alignment matrices and comprising: (a) receiving a barcode signal, the barcode signal being associated with a portion of a first linear barcode symbol and including a sequence of bar elements and space elements in alternating order; (b) diagonally aligning the sequence on a sequence alignment matrix comprised of a plurality of matrix squares such that each row of matrix squares represents an element in a reconstructed portion of the first linear barcode symbol, each column of matrix squares represents an element of the received barcode signal sequence, and the received barcode signal sequence is sequentially aligned on a plurality of diagonals of the sequence alignment matrix such that each of the plurality of diagonals represents a potential alignment of the elements of the received barcode signal sequence and elements of the reconstructed portion of the first linear barcode symbol; (c) assigning a matrix square score to each matrix square that includes an element of the received barcode signal sequence, each matrix square score indicating whether or not there is element alignment at that matrix square; and (d) calculating a diagonal score for each of the plurality of diagonals by summing the scores for each matrix square respectively comprising each of the plurality of diagonals.

Feature 2: The method of feature 1, wherein assigning a matrix square score to each matrix square that includes an element of the received barcode signal sequence comprises, for each of the plurality of diagonals, assigning a progressive positive integer to each sequential matrix square having a matching element between the elements of the reconstructed portion of the first linear barcode symbol and the elements of the received barcode signal sequence.

Feature 3: The method of feature 2, wherein assigning a progressive positive integer to each sequential matrix square having a matching element between the elements of the reconstructed portion of the first linear barcode symbol and the elements of the received barcode signal sequence comprises assigning a progressive positive integer beginning with number one (1) to each sequential matrix square having a matching element between the elements of the reconstructed portion of the first linear barcode symbol and the elements of the received barcode signal sequence.

Feature 4: The method of any of features 2 or 3, wherein assigning a matrix square score to each matrix square that includes an element of the received barcode signal sequence comprises, for each of the plurality of diagonals, assigning a value of zero (0) to each matrix square that does not have a matching element between the elements of the reconstructed portion of the first linear barcode symbol and the elements of the received barcode signal sequence.

Feature 5: The method of feature 4, wherein assigning a matrix square score to each matrix square that includes an element of the received barcode signal sequence comprises, for each of the plurality of diagonals, assigning a value of one (1) to each matrix square that follows a matrix square having an assigned value of zero (0).

Feature 6: The method of any of features 1-5, wherein an element merge in the received barcode signal sequence results in a subsequence of non-matching elements between the elements of the reconstructed portion of the first linear barcode symbol and the elements of the received barcode signal sequence that are vertically aligned on the sequence alignment matrix.

Feature 7: The method of any of features 1-6, wherein an element split in the received barcode signal sequence results in a subsequence of non-matching elements between the elements of the reconstructed portion of the first linear barcode symbol and the elements of the received barcode signal sequence that are horizontally aligned on the sequence alignment matrix.

Feature 8: The method of any of features 1-7, further comprising calculating a potential alignment score for a potential element alignment that includes matrix squares from at least two of the plurality of diagonals, wherein the potential alignment score is calculated by: (a) calculating a first partial potential alignment score for the potential element alignment by summing the matrix square scores for a portion of the matrix squares comprising a first of the plurality of diagonals, the portion terminating upon encountering an endpoint of one of an element split subsequence or an element merge subsequence; (b) switching alignment to a second of the plurality of diagonals, the second of the plurality of diagonals including an opposing endpoint of the one of the element split subsequence or the element merge subsequence; (c) calculating a second partial potential alignment score for the potential element alignment by summing the matrix square scores for a portion of the matrix squares comprising the second of the plurality of diagonals, the portion originating at the opposing endpoint of the one of the element split subsequence or the element merge subsequence; and (d) summing the first partial score and the second partial score.

Feature 9: The method of feature 8, further comprising updating the reconstructed portion of the first linear barcode symbol utilizing the aligned bar elements and space elements comprising the matrix squares resulting in the diagonal score or the potential alignment score that has the highest numerical score.

Feature 10: The method of any of features 1-9, wherein receiving the barcode signal associated with the portion of the first linear barcode symbol comprises receiving a plurality of successive barcode signals associated with portions of the first linear barcode symbol.

Feature 11: The method of feature 10, further comprising iteratively performing steps (b), (c), and (d) for each of the plurality of successive barcode signals received.

Feature 12: The method of feature 11, further comprising updating the reconstructed portion of the first linear barcode symbol utilizing the aligned bar elements and space elements comprising the matrix squares resulting in the diagonal score that has the highest numerical value for each of the plurality of successive barcode signals received.

Feature 13: The method of feature 12, further comprising averaging the highest numerical value for each of the plurality of successive barcode signals received to create a barcode quality index measure.

Feature 14: The method of feature 13, further comprising normalizing the highest numerical value for each of the plurality of successive barcode signals received to a value between zero (0) and one (1) to create the barcode quality index measure.

Feature 15: One or more computer-readable storage media storing computer-useable instructions that, when used by one or more computing devices, cause the one or more computing devices to perform a method for reconstructing barcode signals utilizing sequence alignment matrices, the method comprising: (a) receiving a plurality of successive laser barcode signals, each of the plurality of barcode signals being associated with a portion of a first linear barcode symbol and including a sequence of bar elements and space elements in alternating order; (b) for each of the plurality of successive laser barcode signals, diagonally aligning the sequence on a sequence alignment matrix comprised of a plurality of matrix squares such that each row of matrix squares represents an element in a reconstructed portion of the first linear barcode symbol, each column of matrix squares represents an element of the received barcode signal sequence, and the received barcode signal sequence is sequentially aligned on a plurality of diagonals of the sequence alignment matrix such that each of the plurality of diagonals represents a potential alignment of the elements of a received barcode signal sequence and elements of the reconstructed portion of the first linear barcode symbol; (c) for each of the plurality of successive laser barcode signals, assigning a score to each matrix square that includes an element of the sequence, the matrix square score indicating whether or not there is element alignment at that square; (d) for each of the plurality of successive laser barcode signals, calculating a score for each of the plurality of diagonals by summing the scores for each matrix square respectively comprising each of the plurality of diagonals; and (e) for each of the plurality of successive laser barcode signals received, updating the reconstructed portion of the first linear barcode symbol utilizing the aligned bar elements and space elements comprising the one of the plurality of diagonals that has the highest numerical score.

Feature 16: The one or more computer-readable storage media of feature 15, wherein, for each of the plurality of successive laser barcode signals, assigning a score to each matrix square that includes an element of the sequence comprises, for each of the plurality of diagonals, assigning a progressive positive integer to each sequential matrix square having a matching element between the elements of the reconstructed portion of the first linear barcode symbol and the elements of the received barcode signal sequence.

Feature 17: The one or more computer-readable storage media of feature 16, wherein, for each of the plurality of successive laser barcode signals, assigning a progressive positive integer to each sequential matrix square having a matching element between the elements of the reconstructed portion of the first linear barcode symbol and the elements of the received barcode signal sequence comprises assigning a progressive positive integer beginning with number one (1) to each sequential matrix square having a matching element between the elements of the reconstructed portion of the first linear barcode symbol and the elements of the received barcode signal sequence.

Feature 18: The one or more computer-readable storage media of any of features 16 and 17, wherein, for each of the plurality of successive laser barcode signals, assigning a matrix square score to each matrix square that includes an element of the received barcode signal sequence comprises, for each of the plurality of diagonals, assigning a value of zero (0) to each matrix square that does not have a matching element between the elements of the reconstructed portion of the first linear barcode symbol and the elements of the received barcode signal sequence.

Feature 19: The one or more computer-readable storage media of feature 18, wherein, for each of the plurality of successive laser barcode signals, assigning a matrix square score to each matrix square that includes an element of the received barcode signal sequence comprises, for each of the plurality of diagonals, assigning a value of one (1) to each matrix square that follows a matrix square having an assigned value of zero (0).

Feature 20: The one or more computer-readable storage media of any of features 15-19, wherein an element merge in the received barcode signal sequence results in a subsequence of non-matching elements between the elements of the reconstructed portion of the first linear barcode symbol and the elements of the received barcode signal sequence that are vertically aligned on the sequence alignment matrix.

Feature 21: The one or more computer-readable storage media of feature 20, wherein an element split in the received barcode signal sequence results in a subsequence of non-matching elements between the elements of the reconstructed portion of the first linear barcode symbol and the elements of the received barcode signal sequence that are horizontally aligned on the sequence alignment matrix.

Feature 22: The one or more computer-readable storage media of feature 21, wherein the method further comprises, for one or more of the plurality of successive laser barcode signals, calculating a potential alignment score for a potential element alignment that includes matrix squares from at least two of the plurality of diagonals, wherein the potential alignment score is calculated by: (a) calculating a first partial potential alignment score for the potential element alignment by summing the matrix square scores for a portion of the matrix squares comprising a first of the plurality of diagonals, the portion terminating upon encountering an endpoint of one of an element split subsequence or an element merge subsequence; (b) switching alignment to a second of the plurality of diagonals, the second of the plurality of diagonals including an opposing endpoint of the one of the element split subsequence or the element merge subsequence; (c) calculating a second partial potential alignment score for the potential element alignment by summing the matrix square scores for a portion of the matrix squares comprising the second of the plurality of diagonals, the portion originating at the opposing endpoint of the one of the element split subsequence or the element merge subsequence; and (d) summing the first partial score and the second partial score.

Feature 23: The one or more computer-readable storage media of any of features 15-22, wherein the method further comprises averaging the highest numerical value for each of the plurality of successive barcode signals received to create a barcode quality index measure.

Feature 24: The one or more computer-readable storage media of feature 23, wherein the method further comprises normalizing the highest numerical value for each of the plurality of successive barcode signals received to a value between zero (0) and one (1) to create the barcode quality index measure.

Feature 25: A barcode reader for reconstructing barcode signals utilizing sequence alignment matrices, the barcode reader comprising: (a) a signal receiving component configured for receiving a barcode signal, the barcode signal being associated with a portion of a first linear barcode symbol and including a sequence of bar elements and space elements in alternating order; (b) an aligning component configured for diagonally aligning the sequence on a sequence alignment matrix comprised of a plurality of matrix squares such that: each row of matrix squares represents an element in a reconstructed portion of the first linear barcode symbol, each column of matrix squares represents an element of the received barcode signal sequence, and the received barcode signal sequence is sequentially aligned on a plurality of diagonals of the sequence alignment matrix such that each of the plurality of diagonals represents a potential alignment of the elements of the received barcode signal sequence and elements of the reconstructed portion of the first linear barcode symbol; (c) a matrix square scoring component configured for assigning a matrix square score to each matrix square that includes an element of the received barcode signal sequence, each matrix square score indicating whether or not there is element alignment at that matrix square; and (d) a calculating component configured for calculating a diagonal score for each of the plurality of diagonals by summing the scores for each matrix square respectively comprising each of the plurality of diagonals.

Feature 26: The barcode reader of feature 25, wherein the calculating component is further configured to calculate a potential alignment score for a potential element alignment that includes matrix squares from at least two of the plurality of diagonals, wherein the potential alignment score is calculated by: (a) calculating a first partial potential alignment score for the potential element alignment by summing the matrix square scores for a portion of the matrix squares comprising a first of the plurality of diagonals, the portion terminating upon encountering an endpoint of one of an element split subsequence or an element merge subsequence; (b) switching alignment to a second of the plurality of diagonals, the second of the plurality of diagonals including an opposing endpoint of the one of the element split subsequence or the element merge subsequence; (c) calculating a second partial potential alignment score for the potential alignment score by summing the matrix square scores for a portion of the matrix squares comprising the second of the plurality of diagonals, the portion originating at the opposing endpoint of the one of the element split subsequence or the element merge subsequence; and (d) summing the first partial score and the second partial score.

Feature 27: The barcode reader of any of features 25 and 26, further comprising a barcode updating component configured for updating the reconstructed portion of the first linear barcode symbol utilizing the aligned bar elements and space elements comprising the matrix squares resulting in the diagonal score or the potential alignment score that has the highest numerical score.

As can be understood, embodiments of the present invention provide systems, methods, and computer-readable storage media for, among other things, reconstructing barcode signals utilizing sequence alignment matrices. Aspects hereof have been described in relation to particular embodiments, which are intended in all respects to be illustrative rather than restrictive. Alternative embodiments will become apparent to those of ordinary skill in the art to which aspects of the present invention pertain without departing from its scope.

While aspects hereof are susceptible to various modifications and alternative constructions, certain illustrated embodiments are shown in the drawings and have been described above in detail. It should be understood, however, that there is no intention to limit aspects hereof to the specific forms disclosed, but on the contrary, the intention is to cover all modifications, alternative constructions, and equivalents falling within the spirit and scope of aspects of the invention.

What is claimed is:

1. A method being performed by one or more computing devices including at least one processor, the method for reconstructing barcode signals utilizing sequence alignment matrices and comprising:
   (a) receiving a barcode signal, the barcode signal being associated with a portion of a first linear barcode symbol and including a sequence of bar elements and space elements in alternating order;
   (b) diagonally aligning the sequence on a sequence alignment matrix comprised of a plurality of matrix squares such that:
   each row of matrix squares represents an element in a reconstructed portion of the first linear barcode symbol,
   each column of matrix squares represents an element of the received barcode signal sequence, and
   the received barcode signal sequence is sequentially aligned on a plurality of diagonals of the sequence alignment matrix such that each of the plurality of diagonals represents a potential alignment of the elements of the received barcode signal sequence and elements of the reconstructed portion of the first linear barcode symbol;
   (c) assigning, for each of the plurality of diagonals, a progressive positive integer to each sequential matrix square having a matching element between the elements of the reconstructed portion of the first linear barcode symbol and the elements of the received barcode signal sequence, each matrix square score indicating whether or not there is element alignment at that matrix square; and
   (d) calculating a diagonal score for each of the plurality of diagonals by summing the scores for each matrix square respectively comprising each of the plurality of diagonals.

2. The method of claim 1, wherein assigning a progressive positive integer to each sequential matrix square having a matching element between the elements of the reconstructed portion of the first linear barcode symbol and the elements of the received barcode signal sequence comprises assigning a progressive positive integer beginning with number one (1) to each sequential matrix square having a matching element between the elements of the reconstructed portion of the first linear barcode symbol and the elements of the received barcode signal sequence.

3. The method of claim 1, wherein assigning a matrix square score to each matrix square that includes an element of the received barcode signal sequence comprises, for each of the plurality of diagonals, assigning a value of zero (0) to each matrix square that does not have a matching element between the elements of the reconstructed portion of the first linear barcode symbol and the elements of the received barcode signal sequence.

4. The method of claim 3, wherein assigning a matrix square score to each matrix square that includes an element of the received barcode signal sequence comprises, for each of the plurality of diagonals, assigning a value of one (1) to each matrix square that follows a matrix square having an assigned value of zero (0).

5. The method of claim 1, wherein an element merge in the received barcode signal sequence results in a subsequence of non-matching elements between the elements of the reconstructed portion of the first linear barcode symbol and the elements of the received barcode signal sequence that are vertically aligned on the sequence alignment matrix.

6. The method of claim 5, wherein an element split in the received barcode signal sequence results in a subsequence of non-matching elements between the elements of the reconstructed portion of the first linear barcode symbol and the elements of the received barcode signal sequence that are horizontally aligned on the sequence alignment matrix.

7. The method of claim 6, further comprising calculating a potential alignment score for a potential element alignment that includes matrix squares from at least two of the plurality of diagonals, wherein the potential alignment score is calculated by:
  calculating a first partial potential alignment score for the potential element alignment by summing the matrix square scores for a portion of the matrix squares comprising a first of the plurality of diagonals, the portion terminating upon encountering an endpoint of one of an element split subsequence or an element merge subsequence;
  switching alignment to a second of the plurality of diagonals, the second of the plurality of diagonals including an opposing endpoint of the one of the element split subsequence or the element merge subsequence;
  calculating a second partial potential alignment score for the potential element alignment by summing the matrix square scores for a portion of the matrix squares comprising the second of the plurality of diagonals, the portion originating at the opposing endpoint of the one of the element split subsequence or the element merge subsequence; and
  summing the first partial score and the second partial score.

8. The method of claim 7, further comprising updating the reconstructed portion of the first linear barcode symbol utilizing the aligned bar elements and space elements comprising the matrix squares resulting in the diagonal score or the potential alignment score that has the highest numerical score.

9. The method of claim 1, wherein receiving the barcode signal associated with the portion of the first linear barcode symbol comprises receiving a plurality of successive barcode signals associated with portions of the first linear barcode symbol.

10. The method of claim 9, further comprising iteratively performing steps (b), (c), and (d) for each of the plurality of successive barcode signals received.

11. The method of claim 10, further comprising updating the reconstructed portion of the first linear barcode symbol utilizing the aligned bar elements and space elements comprising the matrix squares resulting in the diagonal score that has the highest numerical value for each of the plurality of successive barcode signals received.

12. The method of claim 11, further comprising averaging the highest numerical value for each of the plurality of successive barcode signals received to create a barcode quality index measure.

13. The method of claim 12, further comprising normalizing the highest numerical value for each of the plurality of successive barcode signals received to a value between zero (0) and one (1) to create the barcode quality index measure.

14. One or more computer-readable storage media storing computer-useable instructions that, when used by one or more computing devices, cause the one or more computing devices to perform a method for reconstructing barcode signals utilizing sequence alignment matrices, the method comprising:
  (a) receiving a plurality of successive laser barcode signals, each of the plurality of barcode signals being associated with a portion of a first linear barcode symbol and including a sequence of bar elements and space elements in alternating order;
  (b) for each of the plurality of successive laser barcode signals, diagonally aligning the sequence on a sequence alignment matrix comprised of a plurality of matrix squares such that:
    each row of matrix squares represents an element in a reconstructed portion of the first linear barcode symbol,
    each column of matrix squares represents an element of the received barcode signal sequence, and
    the received barcode signal sequence is sequentially aligned on a plurality of diagonals of the sequence alignment matrix such that each of
    the plurality of diagonals represents a potential alignment of the elements of a received barcode signal sequence and elements of the reconstructed portion of the first linear barcode symbol;
  (c) for each of the plurality of successive laser barcode signals, assigning a score to each matrix square that includes an element of the sequence, the matrix square score indicating whether or not there is element alignment at that square;
  (d) for each of the plurality of successive laser barcode signals, calculating a score for each of the plurality of diagonals by summing the scores for each matrix square respectively comprising each of the plurality of diagonals; and
  (e) for each of the plurality of successive laser barcode signals received, updating the reconstructed portion of the first linear barcode symbol utilizing the aligned bar elements and space elements comprising the one of the plurality of diagonals that has the highest numerical score.

15. The one or more computer-readable storage media of claim 14, wherein, for each of the plurality of successive laser barcode signals, assigning a score to each matrix square that includes an element of the sequence comprises, for each of the plurality of diagonals, assigning a progressive positive integer to each sequential matrix square having a matching element between the elements of the reconstructed portion of the first linear barcode symbol and the elements of the received barcode signal sequence.

16. The one or more computer-readable storage media of claim 15, wherein, for each of the plurality of successive laser barcode signals, assigning a progressive positive integer to each sequential matrix square having a matching element between the elements of the reconstructed portion of the first linear barcode symbol and the elements of the received barcode signal sequence comprises assigning a progressive positive integer beginning with number one (1) to each sequential matrix square having a matching element between the elements of the reconstructed portion of the first linear barcode symbol and the elements of the received barcode signal sequence.

17. The one or more computer-readable storage media of claim 15, wherein, for each of the plurality of successive laser barcode signals, assigning a matrix square score to each matrix square that includes an element of the received barcode signal sequence comprises, for each of the plurality of diagonals, assigning a value of zero (0) to each matrix square that does not have a matching element between the elements of the reconstructed portion of the first linear barcode symbol and the elements of the received barcode signal sequence.

18. The one or more computer-readable storage media of claim 17, wherein, for each of the plurality of successive laser barcode signals, assigning a matrix square score to each matrix square that includes an element of the received barcode signal sequence comprises, for each of the plurality of diagonals, assigning a value of one (1) to each matrix square that follows a matrix square having an assigned value of zero (0).

19. The one or more computer-readable storage media of claim 14, wherein an element merge in the received barcode signal sequence results in a subsequence of non-matching elements between the elements of the reconstructed portion of the first linear barcode symbol and the elements of the received barcode signal sequence that are vertically aligned on the sequence alignment matrix.

20. The one or more computer-readable storage media of claim 19, wherein an element split in the received barcode signal sequence results in a subsequence of non-matching elements between the elements of the reconstructed portion of the first linear barcode symbol and the elements of the received barcode signal sequence that are horizontally aligned on the sequence alignment matrix.

21. The one or more computer-readable storage media of claim 20, wherein the method further comprises, for one or more of the plurality of successive laser barcode signals, calculating a potential alignment score for a potential element alignment that includes matrix squares from at least two of the plurality of diagonals, wherein the potential alignment score is calculated by:
  calculating a first partial potential alignment score for the potential element alignment by summing the matrix square scores for a portion of the matrix squares comprising a first of the plurality of diagonals, the portion terminating upon encountering an endpoint of one of an element split subsequence or an element merge subsequence;
  switching alignment to a second of the plurality of diagonals, the second of the plurality of diagonals including an opposing endpoint of the one of the element split subsequence or the element merge subsequence;
  calculating a second partial potential alignment score for the potential element alignment by summing the matrix square scores for a portion of the matrix squares comprising the second of the plurality of diagonals, the portion originating at the opposing endpoint of the one of the element split subsequence or the element merge subsequence; and
  summing the first partial score and the second partial score.

22. The one or more computer-readable storage media of claim 14, wherein the method further comprises averaging the highest numerical value for each of the plurality of successive barcode signals received to create a barcode quality index measure.

23. The one or more computer-readable storage media of claim 22, wherein the method further comprises normalizing the highest numerical value for each of the plurality of successive barcode signals received to a value between zero (0) and one (1) to create the barcode quality index measure.

24. A barcode reader for reconstructing barcode signals utilizing sequence alignment matrices, the barcode reader comprising:
  (a) a signal receiving component configured for receiving a barcode signal, the barcode signal being associated with a portion of a first linear barcode symbol and including a sequence of bar elements and space elements in alternating order;
  (b) an aligning component configured for diagonally aligning the sequence on a sequence alignment matrix comprised of a plurality of matrix squares such that:
    each row of matrix squares represents an element in a reconstructed portion of the first linear barcode symbol,
    each column of matrix squares represents an element of the received barcode signal sequence, and
    the received barcode signal sequence is sequentially aligned on a plurality of diagonals of the sequence alignment matrix such that each of the plurality of diagonals represents a potential alignment of the elements of the received barcode signal sequence and elements of the reconstructed portion of the first linear barcode symbol;
  (c) a matrix square scoring component configured for assigning a matrix square score to each matrix square that includes an element of the received barcode signal sequence, each matrix square score indicating whether or not there is element alignment at that matrix square; and
  (d) a calculating component configured for calculating a diagonal score for each of the plurality of diagonals by summing the scores for each matrix square respectively comprising each of the plurality of diagonals.

25. The barcode reader of claim 24, wherein the calculating component is further configured to calculate a potential alignment score for a potential element alignment that includes matrix squares from at least two of the plurality of diagonals, wherein the potential alignment score is calculated by:
  calculating a first partial potential alignment score for the potential element alignment by summing the matrix square scores for a portion of the matrix squares comprising a first of the plurality of diagonals, the portion
  terminating upon encountering an endpoint of one of an element split subsequence or an element merge subsequence;
  switching alignment to a second of the plurality of diagonals, the second of the plurality of diagonals including an opposing endpoint of the one of the element split subsequence or the element merge subsequence;
  calculating a second partial potential alignment score for the potential alignment score by summing the matrix square scores for a portion of the matrix squares comprising the second of the plurality of diagonals, the portion originating at the opposing endpoint of the one of the element split subsequence or the element merge subsequence; and
  summing the first partial score and the second partial score.

26. The barcode reader of claim 24, further comprising a barcode updating component configured for updating the reconstructed portion of the first linear barcode symbol utilizing the aligned bar elements and space elements comprising the matrix squares resulting in the diagonal score or the potential alignment score that has the highest numerical score.

* * * * *